Patented Dec. 11, 1934

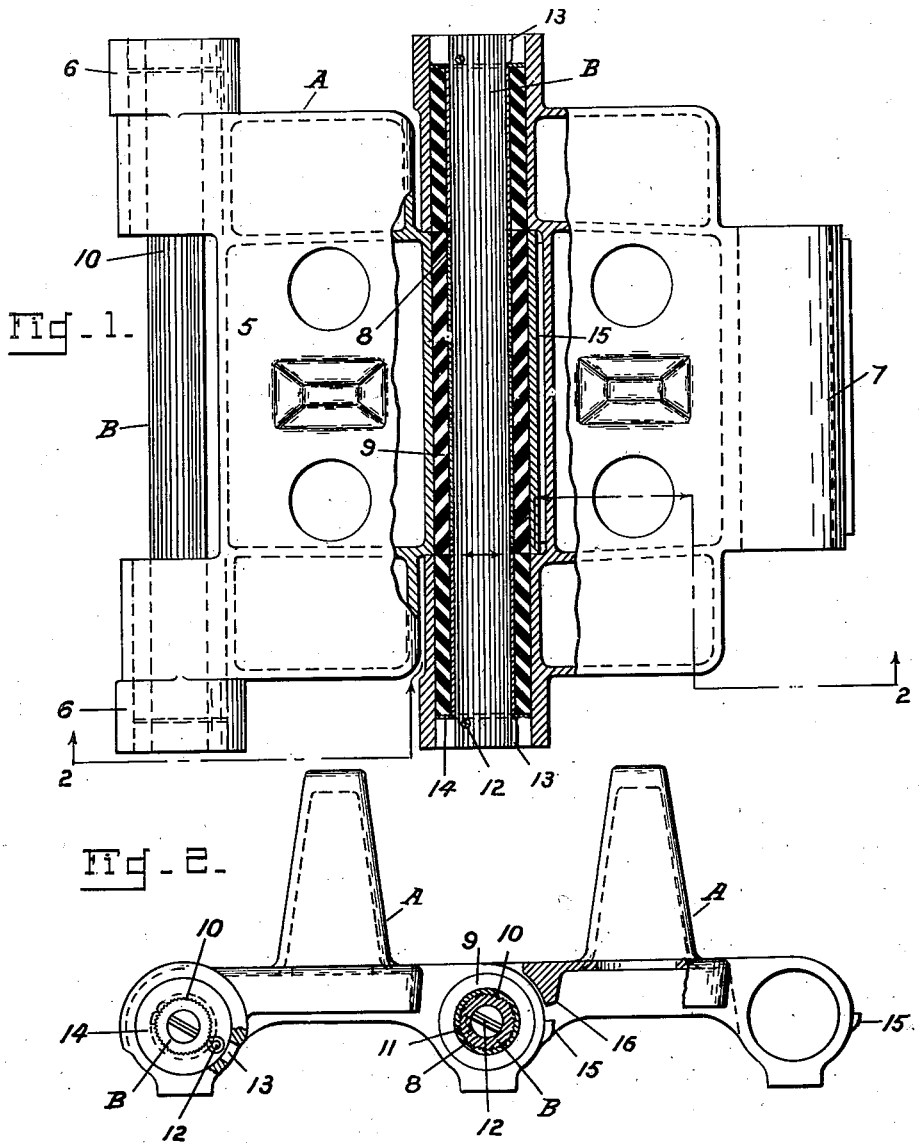

1,983,548

UNITED STATES PATENT OFFICE 1,983,548

TRACK FOR TRACKLAYING VEHICLES

Harry A. Knox, Davenport, Iowa, and Charles Hiller, Jr., St. Louis, Mo.

Application February 6, 1933, Serial No. 655,444

1 Claim. (Cl. 305—10)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a track for tracklaying vehicles.

The purpose of the invention is to provide a light strong track in which the metal parts of the joints are not subject to wear. This is accomplished by providing rubber bushings in all of the bearings.

A further object of the invention is to reduce the wear on the rubber bushings by insuring the cooperation between all of the bushings of the adjoining shoes and by having the bushings of adjoining shoes act in opposite directions to distribute the load and restrict the distortion to one-half of the angle of flection.

Another object is to provide a novel link pin assembly whereby the link pin may be readily inserted and removed and may hold the adjoining shoes in any of a large number of predetermined angular positions.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view partly in section of a portion of the lower flight of the improved track.

Fig. 2 is a view in side elevation and partly in section of Fig. 1.

The track comprises a series of grousers or shoes A connected by means of link pins B.

The shoes are all identical and each one consists of a body 5 having spaced bearings 6—6 on one end and a single centrally located bearing 7 on the opposite end whose width is preferably equal to the total width of the bearings 6. When two shoes are assembled end to end the single bearing 7 of one shoe is adapted to fit between the spaced bearings 6 of the other shoe.

Within each of the bearings is a bushing consisting of an inner metal tube 8 and an outer rubber sleeve 9 vulcanized to the metal tube. The bushing is inserted in the bearing by compressing the rubber sleeve and it is thereby firmly held in place.

The link pin B passes through the aligned bearings 6 and 7 of adjoining shoes. The pin is provided along its entire length with serrations or teeth 10 interengaging with similar serrations or teeth 11 in the metal tubes 8. By virtue of this arrangement the link pin B is held against free rotational movement when either one of the adjoining shoes is flexed. For example in Fig. 1, if the shoe A on the right side is to be moved so as to assume an angular position relative to the shoe on the left side, the link pin B would also be rotated unless it is held and the rubber sleeve 9 in the end bearings 6 would act merely to transmit the angular displacement of the shoe to the link pin. However, when the link pin is held the angular movement of the right shoe can only occur through the distortion of the rubber sleeves in the bearings 6, which, functioning in this manner, are capable of permitting an angular movement of 25 degrees.

In the present instance the link pin B is not rigidly held against rotation but rather it is resistantly held against rotation through the action of the rubber sleeve in the central bearing 7. Consequently when either the right or the left shoe of Fig. 1 is flexed the rubber sleeves in both the bearings 6 and 7 cooperate in yieldingly resisting the flexing. And more than this, the distortion of the rubber in the bearings 6 and 7 will be divided, thereby distributing the load equally and restricting the distortion to one-half the angle of flection. As a result the life of the rubber will be greatly increased over the condition where the rubber must distort the full amount of the angle of flection.

A further advantage attributable to the serrated link pins B resides in the ability to assemble the link at any predetermined angle depending on the size of the sprocket or driving wheel around which the track must pass. The adjustment may be readily made by removing the link pin B, moving the adjoining shoes into the desired angular relation, and then reinserting the link pin. The outer surface of the link pin and the inner surface of the metal tubes 8 are preferably plated to prevent corrosion and facilitate insertion and removal of the link pin.

The pin is conveniently held in place by means of cotter pins 12 inserted through apertures 13 in the opposite ends of the pin. A washer 14 is applied to the outer face of the end bushings and is held in place by the cotter pins.

The central bearing 7 is provided with a lug 15 adapted to engage a restraining surface 16 formed on the body 5 of an adjoining shoe. The purpose is to limit the relative angular displacements of adjoining shoes and thereby to prevent undue distortion of the rubber sleeves.

While the shoes are shown as having a pair of bearings on one end and a single bearing on the other end, it is to be understood that any number of alternately arranged interfitting bearings may be used.

We claim:

In a track for track-laying vehicles, a series of shoes, each shoe comprising a body having alternately arranged undivided bearings on opposite ends, the bearings of adjoining shoes being interfitting, a bushing for each bearing consisting of an internally serrated tube and a rubber sleeve vulcanized to the tube, said bushing inserted in a bearing by compressing the rubber sleeve, a link pin inserted axially through aligned bushings for coupling adjoining shoes, and serrations on the link pin engageable with the internally serrated tubes of the bushings for maintaining selectively predetermined angular positions of assembly of the shoes.

HARRY A. KNOX.
CHARLES HILLER, Jr.